United States Patent
Sai et al.

(10) Patent No.: US 12,280,945 B2
(45) Date of Patent: Apr. 22, 2025

(54) STOCKER

(71) Applicant: MURATA MACHINERY, LTD., Kyoto (JP)

(72) Inventors: Jun Sai, Ise (JP); Takashi Moriwaki, Ise (JP); Kazuma Yagawa, Ise (JP)

(73) Assignee: MURATA MACHINERY, LTD., Kyoto (JP)

(*) Notice: Subject to any disclaimer, the term of this patent is extended or adjusted under 35 U.S.C. 154(b) by 169 days.

(21) Appl. No.: 18/029,939

(22) PCT Filed: Aug. 26, 2021

(86) PCT No.: PCT/JP2021/031398
§ 371 (c)(1),
(2) Date: Apr. 3, 2023

(87) PCT Pub. No.: WO2022/074953
PCT Pub. Date: Apr. 14, 2022

(65) Prior Publication Data
US 2023/0373716 A1 Nov. 23, 2023

(30) Foreign Application Priority Data
Oct. 6, 2020 (JP) .................................. 2020-169233

(51) Int. Cl.
*B65G 1/04* (2006.01)

(52) U.S. Cl.
CPC .... *B65G 1/0421* (2013.01); *B65G 2203/0283* (2013.01)

(58) Field of Classification Search
CPC ............................ B65G 1/0421; B65G 1/0407
See application file for complete search history.

(56) References Cited

U.S. PATENT DOCUMENTS

| | | | |
|---|---|---|---|
| 9,221,606 B2* | 12/2015 | Yoshinaga | B65G 1/0421 |
| 2004/0184901 A1* | 9/2004 | Taguchi | B65G 1/0421 |
| | | | 414/270 |
| 2005/0053450 A1* | 3/2005 | Kantola | B65G 1/0407 |
| | | | 414/273 |

(Continued)

FOREIGN PATENT DOCUMENTS

| | | |
|---|---|---|
| JP | 8-192904 A | 7/1996 |
| JP | 2017-88360 A | 5/2017 |

(Continued)

OTHER PUBLICATIONS

Official Communication issued in International Patent Application No. PCT/JP2021/031398, mailed on Nov. 9, 2021.

(Continued)

*Primary Examiner* — Kaitlin S Joerger
(74) *Attorney, Agent, or Firm* — Keating & Bennett, LLP

(57) ABSTRACT

A stocker includes a crane to travel on a travel route, a maintenance area on an extension of the travel route, a controller to cause the crane to travel toward the maintenance area, a first sensor to detect that the crane is positioned at an entry position, and a second sensor to detect that the crane has arrived at a stop position. The controller is configured or programmed to control the crane to decelerate in accordance with a detection result of the first sensor and control the crane to stop in accordance with a detection result of the second sensor.

4 Claims, 10 Drawing Sheets

(56) References Cited

U.S. PATENT DOCUMENTS

| | | | |
|---|---|---|---|
| 2007/0103107 A1* | 5/2007 | Hayashi | B60L 3/0038 |
| | | | 318/466 |
| 2009/0082968 A1* | 3/2009 | Tanaka | G01B 11/002 |
| | | | 701/300 |
| 2017/0138069 A1 | 5/2017 | Omori et al. | |
| 2020/0017303 A1* | 1/2020 | Grosse | B60L 7/003 |
| 2021/0309457 A1* | 10/2021 | Tsuji | B65G 1/0421 |
| 2022/0227578 A1* | 7/2022 | Kiyokawa | B65G 1/0421 |
| 2022/0258970 A1* | 8/2022 | Sai | B65G 1/0421 |
| 2023/0294916 A1* | 9/2023 | Yagawa | B65G 1/0407 |
| | | | 414/273 |
| 2023/0348186 A1* | 11/2023 | Siraisi | B65G 1/0421 |
| 2023/0373716 A1* | 11/2023 | Sai | B66F 9/24 |

FOREIGN PATENT DOCUMENTS

| | | |
|---|---|---|
| JP | 2018-188244 A | 11/2018 |
| WO | 2011070869 A1 | 6/2011 |

OTHER PUBLICATIONS

Official Communication issued in International Patent Application No. PCT/JP2021/031398, mailed on Apr. 20, 2023.

English translation of Official Communication issued in International Patent Application No. PCT/JP2021/031398, mailed on Nov. 9, 2021.

Official Communication issued in corresponding European Patent Application No. 21877256.4, mailed on Aug. 30, 2024, 7 pages.

* cited by examiner

STOCKER

BACKGROUND OF THE INVENTION

1. Field of the Invention

The present disclosure relates to a stocker.

2. Description of the Related Art

As described in Japanese Unexamined Patent Publication No. 2017-88360, article conveyance equipment is known that includes an article housing shelf including a plurality of housing parts configured to house containers, and a stacker crane installed next to the article housing shelf and moving along the article housing shelf to convey the containers. The stacker crane travels on a travel rail in a moving direction in the interior area of the article conveyance equipment. An area for evacuation for performing maintenance work of the stacker crane is formed in line with an area for conveyance.

SUMMARY OF THE INVENTION

In the conventional technology described above, a movement section for evacuation is set in order to move the stacker crane to the area for evacuation. However, moving the stacker crane to the area for evacuation involves various tasks and is cumbersome for operators. In addition, operators manually move the stacker crane, which takes time to move.

Preferred embodiments of the present invention provide stockers that each can move a crane to a maintenance area quickly and easily.

A stocker according to an aspect of a preferred embodiment of the present disclosure includes a crane to travel on a travel route extending in a travel direction, a maintenance area on an extension of the travel route, a controller configured or programmed to cause the crane to travel toward the maintenance area, a first sensor to detect that the crane is positioned at a proximity position close to the maintenance area or is positioned at an entry position with entry into the maintenance area, and a second sensor to detect that the crane has arrived at a stop position of the maintenance area, in which the controller is configured or programmed to control the crane to decelerate in accordance with a detection result of the first sensor and control the crane to stop in accordance with a detection result of the second sensor.

With this stocker, the controller is configured or programmed to control the crane to cause the crane to travel toward the maintenance area provided on the extension of the travel route. The traveling speed of the crane in this process can be as high a traveling speed as possible until it becomes close to the crane maintenance area. Upon detection that the crane is positioned at the proximity position or is positioned at the entry position by the first sensor, the controller is configured or programmed to control the crane to decelerate. Subsequently, upon detection that the crane has arrived at the stop position in the maintenance area by the second sensor, the controller is configured or programmed to control the crane to stop. Thus, the crane moves at a high traveling speed until it becomes close to or enters the maintenance area and then decelerates inside the maintenance area. Furthermore, the crane automatically stops at the stop position. Thus, this stocker can move the crane to the maintenance area quickly and easily.

The first sensor may be provided correspondingly to a cable assembly including a cable portion to supply power to the crane and detect that the crane is positioned at the proximity position or is positioned at the entry position by detecting movement of the cable portion, and the second sensor may be provided correspondingly to the crane and/or the maintenance area and detect that the crane has arrived at the stop position. In this case, the installation positions of the first sensor and the second sensor can be separated from each other, thus increasing the degree of freedom in the installation positions of both sensors.

The cable portion may include a first end mounted on a central portion in the stocker in the travel direction and a second end mounted on the crane, and the first sensor may detect that the crane is positioned at the proximity position or is positioned at the entry position based on whether a detected portion closer to the first end of the cable portion is present at an installation position of the first sensor. In this case, the first sensor detects that the crane is positioned at the proximity position or is positioned at the entry position based on the presence or absence of the detected portion closer to the first end. The first end is mounted on the central portion in the stocker, and thus the first sensor is also provided near the central portion. Although various devices are installed in the maintenance area, it is not necessary to install the first sensor around the maintenance area. The central area in the stocker has more space than the maintenance area does, thus increasing the degree of freedom in the installation position of the first sensor. This first sensor can also be used to detect that the crane is positioned in a main area in the stocker (for example, to detect that it is in normal operation).

The stocker may further include a second crane traveling on the travel route, in which the cable portion operable to supply power to the crane and a second cable portion operable to supply power to the second crane may be spaced apart from each other in a horizontal width direction perpendicular or substantially perpendicular to the travel direction, and the travel route may be between the cable portion and the second cable portion. With this configuration, the two cable portions are on both sides of the travel route (both sides in the width direction). Thus, two first sensors can be positioned in a distributed manner on both sides of the travel route, making the stocker compact as a whole.

The stocker may further include another crane to travel on another travel route and sharing the maintenance area with the crane and another second sensor to detect that the other crane has arrived at the stop position of the maintenance area, in which the second sensor and the other second sensor may be capable of independently detecting the arrival of the crane at the stop position and the arrival of the other crane at the stop position. With this configuration, the second sensor and the other second sensor do not interfere with each other in separately detecting the arrival of the two cranes at the stop position. Each second sensor enables accurate detection about the stop position without being affected by the movement of a crane not to be detected.

Preferred embodiments of the present disclosure can move cranes to maintenance areas quickly and easily.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
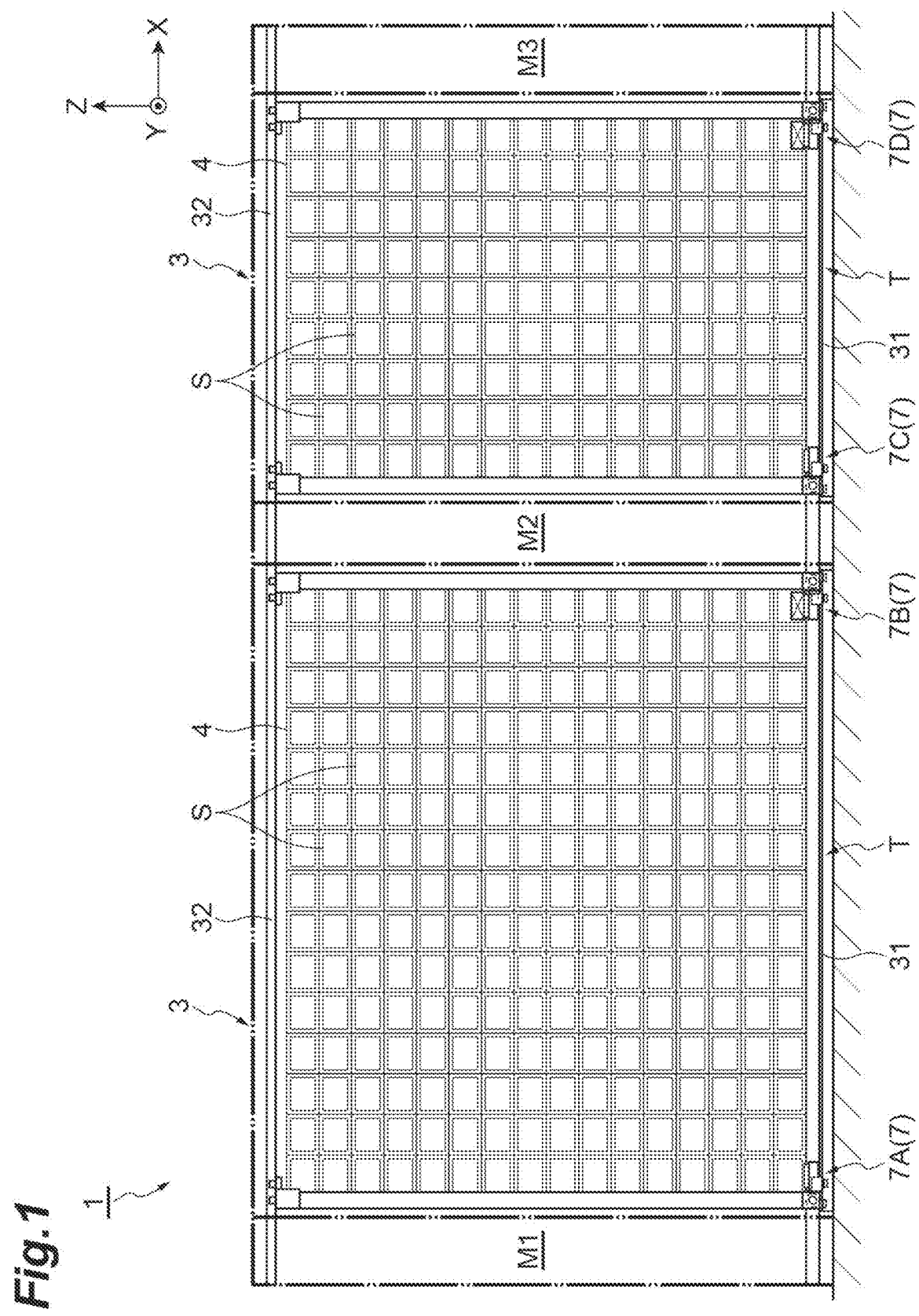
FIG. 1 is a front view illustrating a stocker according to a preferred embodiment of the present invention.

The following describes preferred embodiments of the present disclosure with reference to the accompanying drawings. As illustrated in FIG. 1, a stocker 1 of the present preferred embodiment includes a left stocker 2 and a right stocker 3, for example. Thus, the stocker 1 includes a plurality of stockers arranged in a certain direction. The stocker 1 may include a single stocker. In the stocker 1, a stacker crane 7 travels inside each of the left stocker 2 and the right stocker 3. In the stocker 1, the stacker crane 7 conveys articles between a plurality of shelves S and an entry-and-exit port (not illustrated) provided inside each of the left stocker 2 and the right stocker 3. The left stocker 2 and the right stocker 3 store therein articles conveyed by the stacker crane 7, for example. The articles are containers such as front-opening unified pods (FOUPs) housing wafers to be processed in semiconductor manufacturing apparatuses, liquid crystal manufacturing apparatuses, or the like and reticle pods housing reticles for use in semiconductor manufacturing apparatuses, liquid crystal manufacturing apparatuses, or the like. The stocker 1 may be a stocker installed with a nitrogen purge function, for example.

In the stocker 1, the left stocker 2 and the right stocker 3 are arranged in a travel direction of the stacker crane 7. In the stocker 1, two stacker cranes 7 are placed inside the left stocker 2 and the right stocker 3 each. The left stocker 2 includes a pair of racks 4, a left first stacker crane 7A, and a left second stacker crane 7B, for example. The right stocker 3 includes a pair of racks 4, a right first stacker crane 7C, and a right second stacker crane 7D, for example. The left stocker 2 and the right stocker 3 have a similar configuration except that the racks 4 are different in size, for example. Thus, in the following description, while the left stocker 2 is described, a description of the right stocker 3, which has a similar configuration, may be omitted. The "stacker crane" is referred to as a "crane." For convenience, the travel direction of each stacker crane 7 is defined as an X direction, the vertical direction is defined as a Z direction, and the horizontal direction orthogonal to the X direction and the Z direction is defined as a Y direction (width direction), and the following describes the details of the stocker 1.

The left stocker 2 has a hollow rectangular or substantially rectangular parallelepiped shape, for example. In the left stocker 2, one travel rail 31 on which the left first crane 7A and the left second crane 7B travel and one auxiliary rail 32 opposite to the travel rail 31 in the Z direction are laid along the X direction. The left first crane 7A and the left second crane 7B travel (move) along the travel rail 31 and the auxiliary rail 32. In other words, the left first crane 7A and the left second crane 7B travel on a travel route T extending in the X direction. The left first crane 7A and the left second crane 7B are conveyance apparatuses conveying articles between the shelves S and the entry-and-exit port and transferring articles to the shelves S. Each rack 4 is provided along the X direction in the left stocker 2. The pair of racks 4 are facing each other via the travel rail 31. Each rack 4 is provided with the shelves S in which articles are housed.

Figure 2:
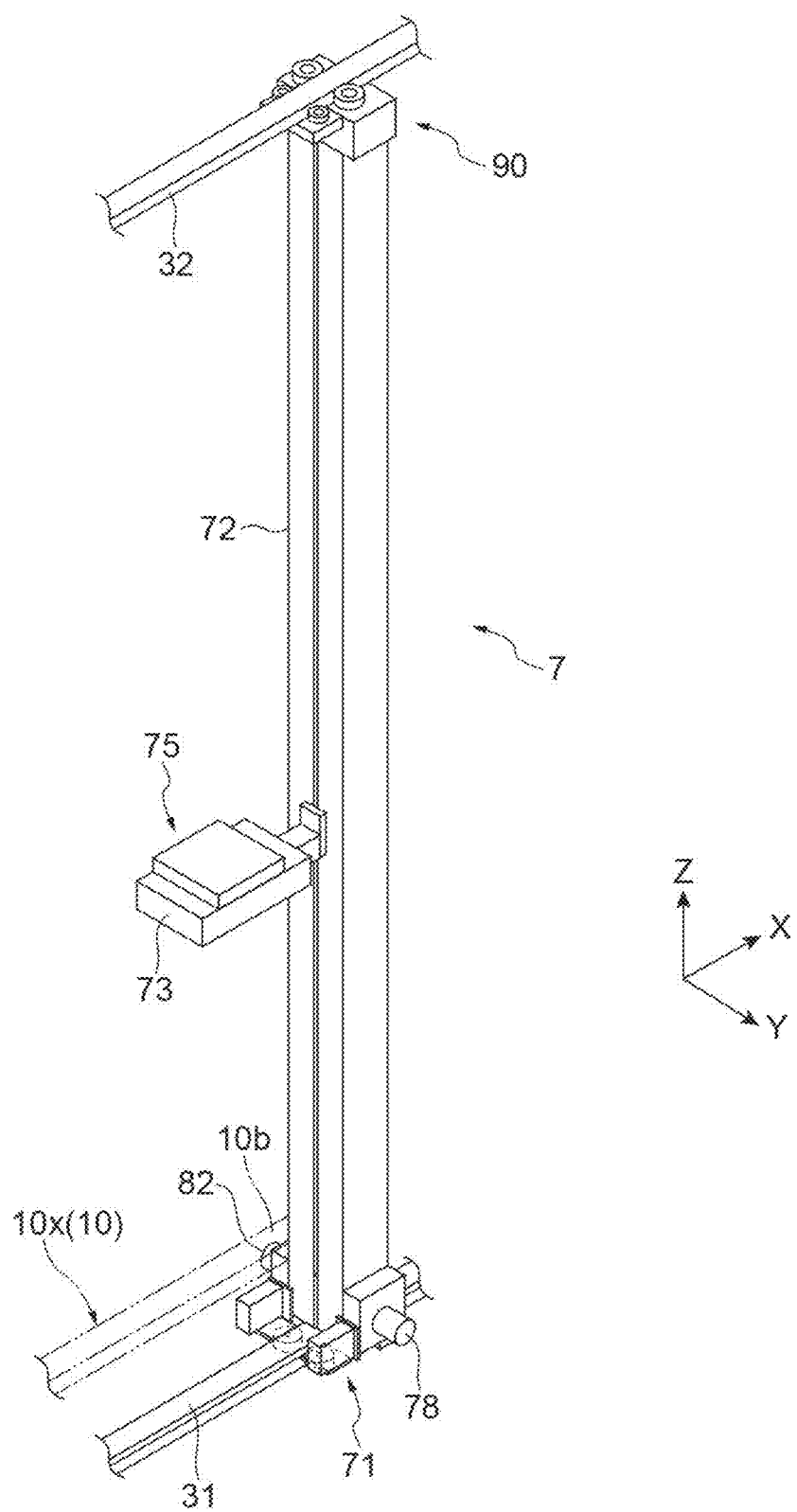
FIG. 2 is a perspective view illustrating a crane provided in the stocker of FIG. 1.

As illustrated in FIG. 2, each crane 7 includes a traveling part 71, a mast 72, a transfer part 75, and an auxiliary traveling part 90. The traveling part 71 includes a traveling motor 78 and a lifting-and-lowering motor 82. The traveling part 71 travels along the travel rail 31. The traveling part 71 includes a drive wheel rolling along the top surface of the travel rail 31. The traveling motor 78 is a driving source of the drive wheel for traveling. The lifting-and-lowering motor 82 is a driving source of a lifting-and-lowering stage 73. A housing (not illustrated) housing the traveling motor 78 and the lifting-and-lowering motor 82 may be provided. The mast 72 is erected in the Z direction at the top of the traveling part 71. The transfer part 75 transfers articles to and from the shelves S and also transfers articles to and from the entry-and-exit port. The auxiliary traveling part 90 travels along the auxiliary rail 32. The auxiliary traveling part 90 includes a pair of drive wheels rolling while holding the auxiliary rail 32 therebetween. By the traveling motor 78 being controlled by a controller 30 (refer to FIG. 3), each crane 7 travels on the travel route T. The traveling motor 78 is a servo motor, for example, and can be controlled at any rotational speed by the controller 30. With this configuration, the controller 30 controls the traveling motor 78 and can cause the crane 7 to travel at any traveling speed. The traveling motor provided in the crane 7 may be another controllable actuator.

As illustrated in FIG. 1, the stocker 1 is provided with a plurality of maintenance areas for performing maintenance work of the crane 7 and the like on the extension of the travel route T. More specifically, the left stocker 2 includes a left maintenance area M1 and a central maintenance area M2 placed on both sides of the rack 4 in the X direction. The right stocker 3 includes the central maintenance area M2 and a right maintenance area M3 placed on both sides of the rack 4 in the X direction. Each maintenance area is installed with ladders, scaffolding, and the like (all not illustrated). An operator can perform maintenance of the crane 7 in each maintenance area and perform maintenance or the like of the shelves S on a maintenance step or the like installed in front of the rack 4. The maintenance area is also called a "maintenance dock."

Each of the left maintenance area M1, the central maintenance area M2, and the right maintenance area M3 can house any of the cranes 7. In the left stocker 2, the left first crane 7A is moved on the travel rail 31, and the left first crane 7A can be housed in the left maintenance area M1, whereas the left second crane 7B is moved on the travel rail 31, and the left second crane 7B can be housed in the central maintenance area M2 (refer to FIG. 4). In the right stocker 3, the right first crane 7C is moved on the travel rail 31, and the right first crane 7C can be housed in the central maintenance area M2, whereas the right second crane 7D is moved on the travel rail 31, and the right second crane 7D can be housed in the right maintenance area M3. Thus, the central maintenance area M2 is shared by the left stocker 2 and the right stocker 3. In the central maintenance area M2, the left second crane 7B can enter from one side (the left side in FIG. 1), whereas the right first crane 7C can enter from the other side (the right side in FIG. 1). The central maintenance area M2 can house either the left second crane 7B or the right first crane 7C. Thus, the travel rail 31 and the auxiliary rail 32 of the left stocker 2 and the travel rail 31 and the auxiliary rail 32 of the right stocker 3 are each coupled to each other in a straight line (refer to FIGS. 8A and 8B and FIGS. 9A and 9B). The central maintenance area M2 can also house both (two) cranes, or the left second crane 7B and the right first crane 7C. In that case, neither the left second crane 7B nor the right first crane 7C can arrive at a stop position P2 described later.

Figure 3:
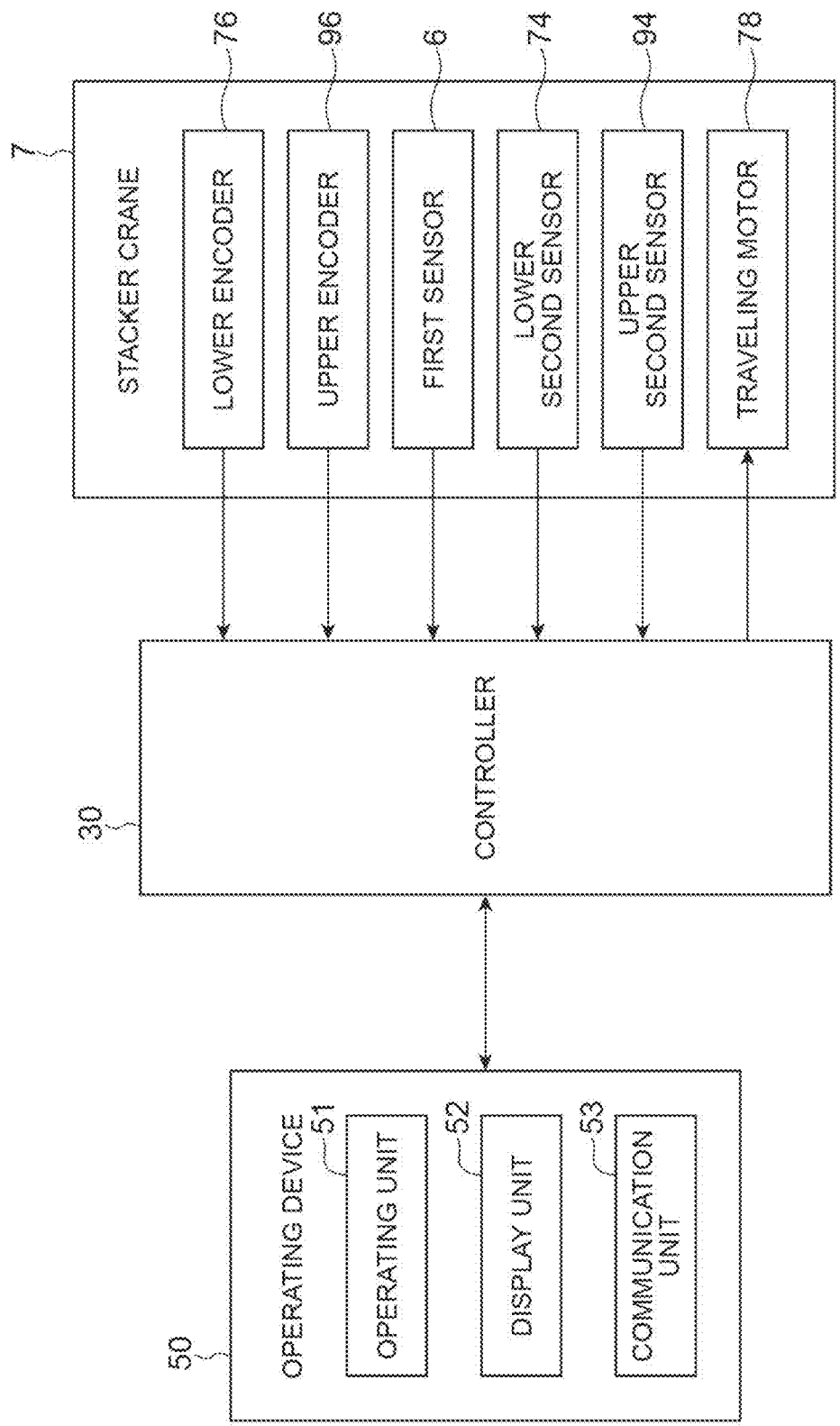
FIG. 3 is a block diagram illustrating a schematic configuration of an operating device, a controller, and the crane.
Figure 10A:
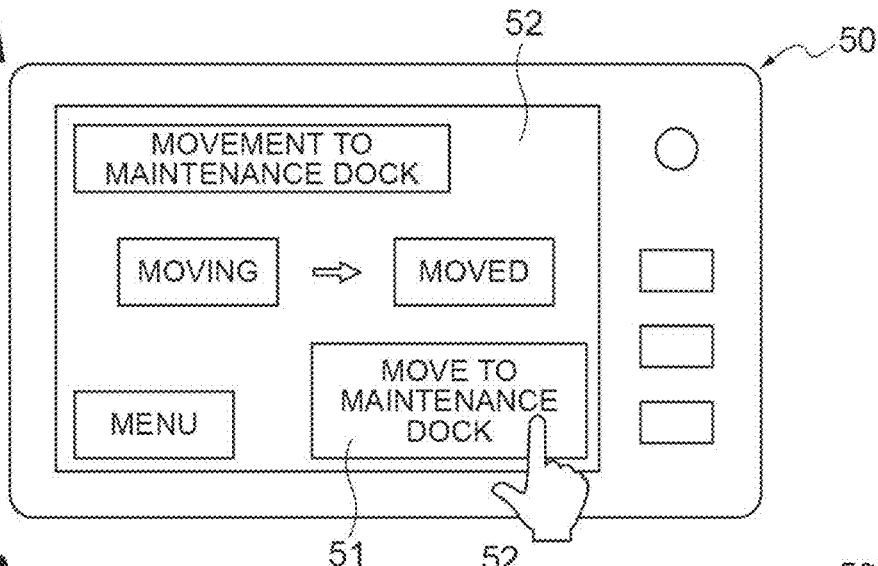
FIG. 10A to FIG. 10C are diagrams illustrating a movement operation of the crane to the maintenance area using the operating device.

As illustrated in FIG. 3 and FIG. 10, by operating an operating device 50 by an operator, for example, each crane 7 is controlled by the controller 30 to move on the travel route T and to enter any of the maintenance areas. In the stocker 1, the movement of the crane 7 to the maintenance area is automatically done with only one push of a button of the operating device 50. When the stocker 1 is installed with the nitrogen purge function, in order to keep the airtightness of a main area MA (interior space) in which the rack 4 is installed, a door or the like is installed on a skirt surface 5 between the maintenance area and the main area MA. When moving the crane 7 to pull it out (move it) to the maintenance area, first, the door of the skirt surface 5 is opened, a stopper or the like provided at the lower part is removed, and the operating device 50 is operated.

Figure 4:
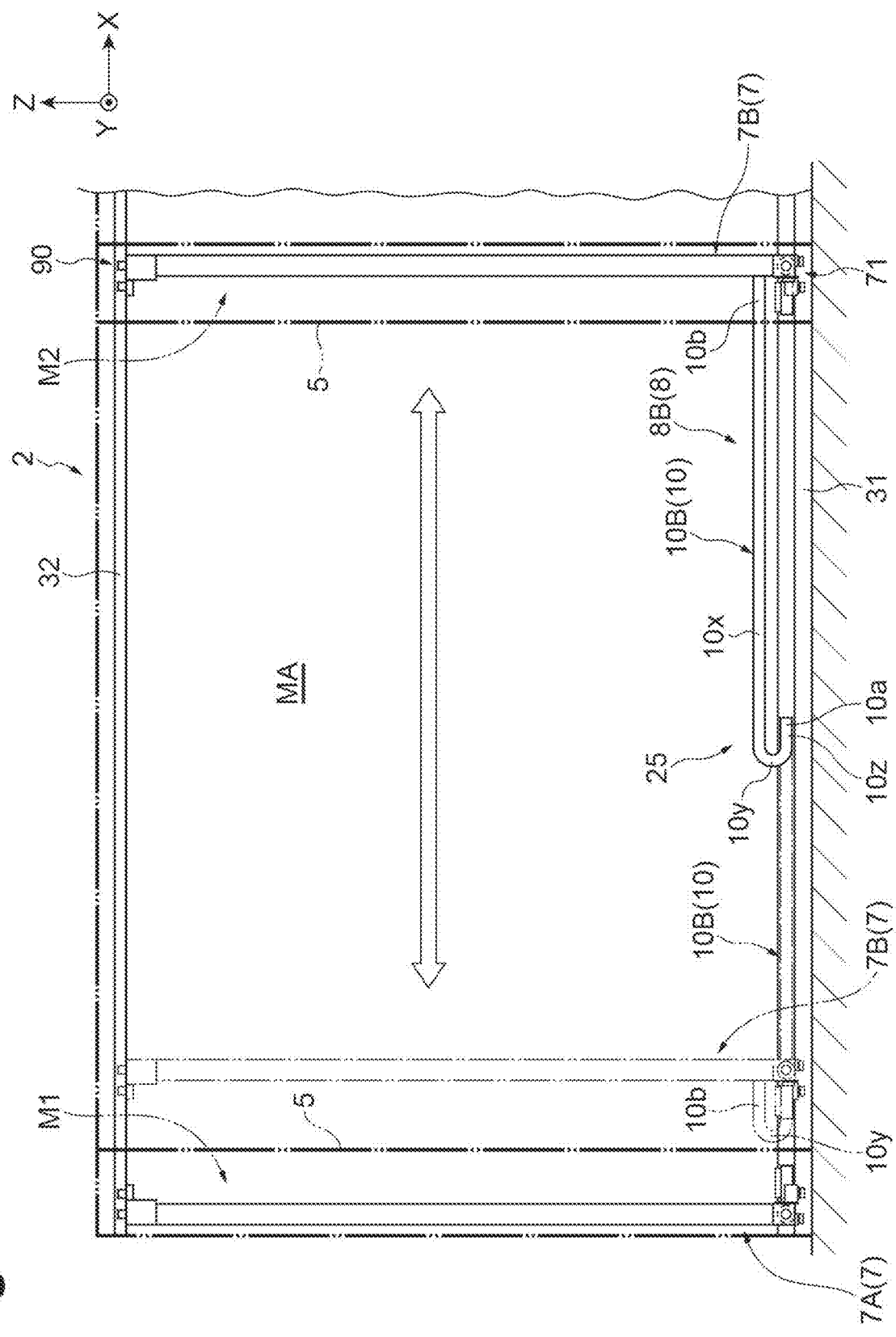
FIG. 4 is a front view illustrating the movement range of the crane and the position and posture of a cable part.
Figure 5:
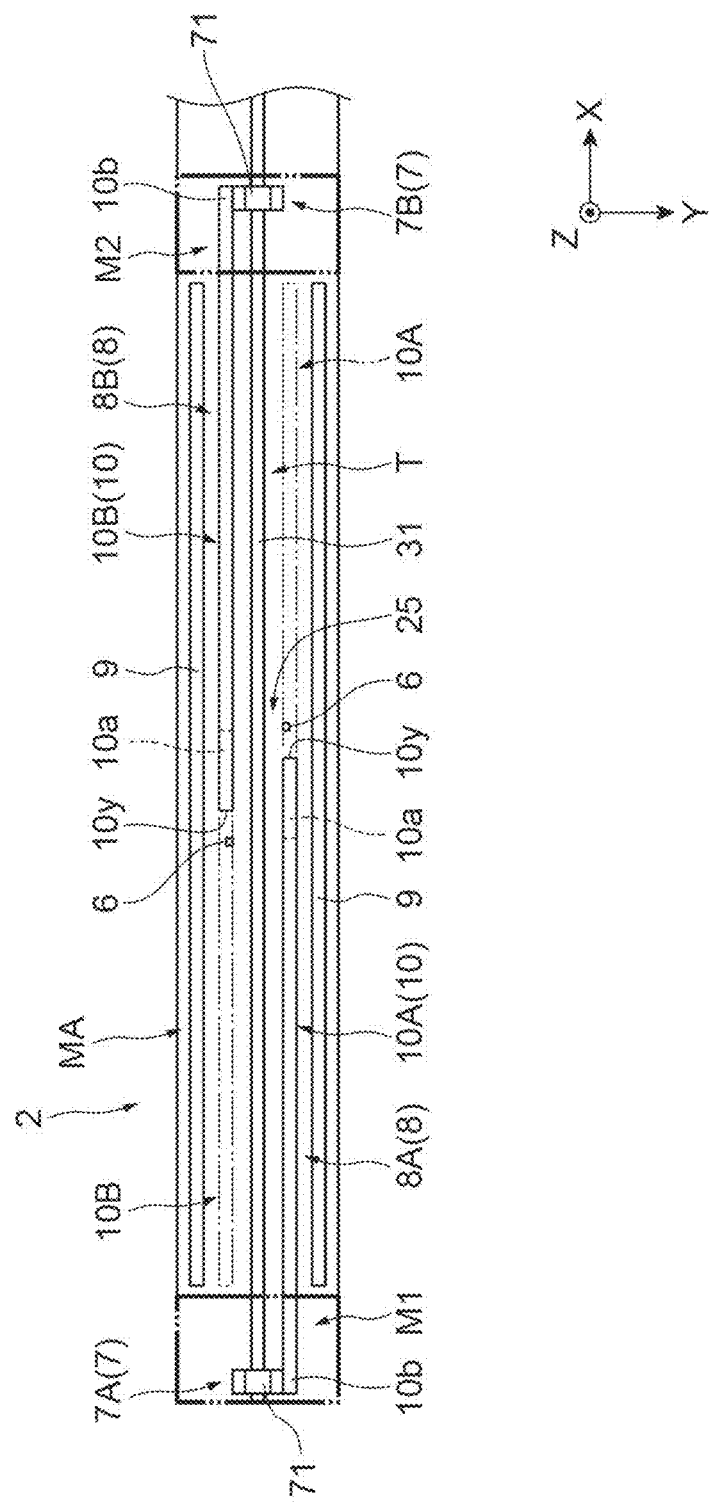
FIG. 5 is a plan view illustrating the arrangement of a rail (travel route) and two cranes.
Figure 6:
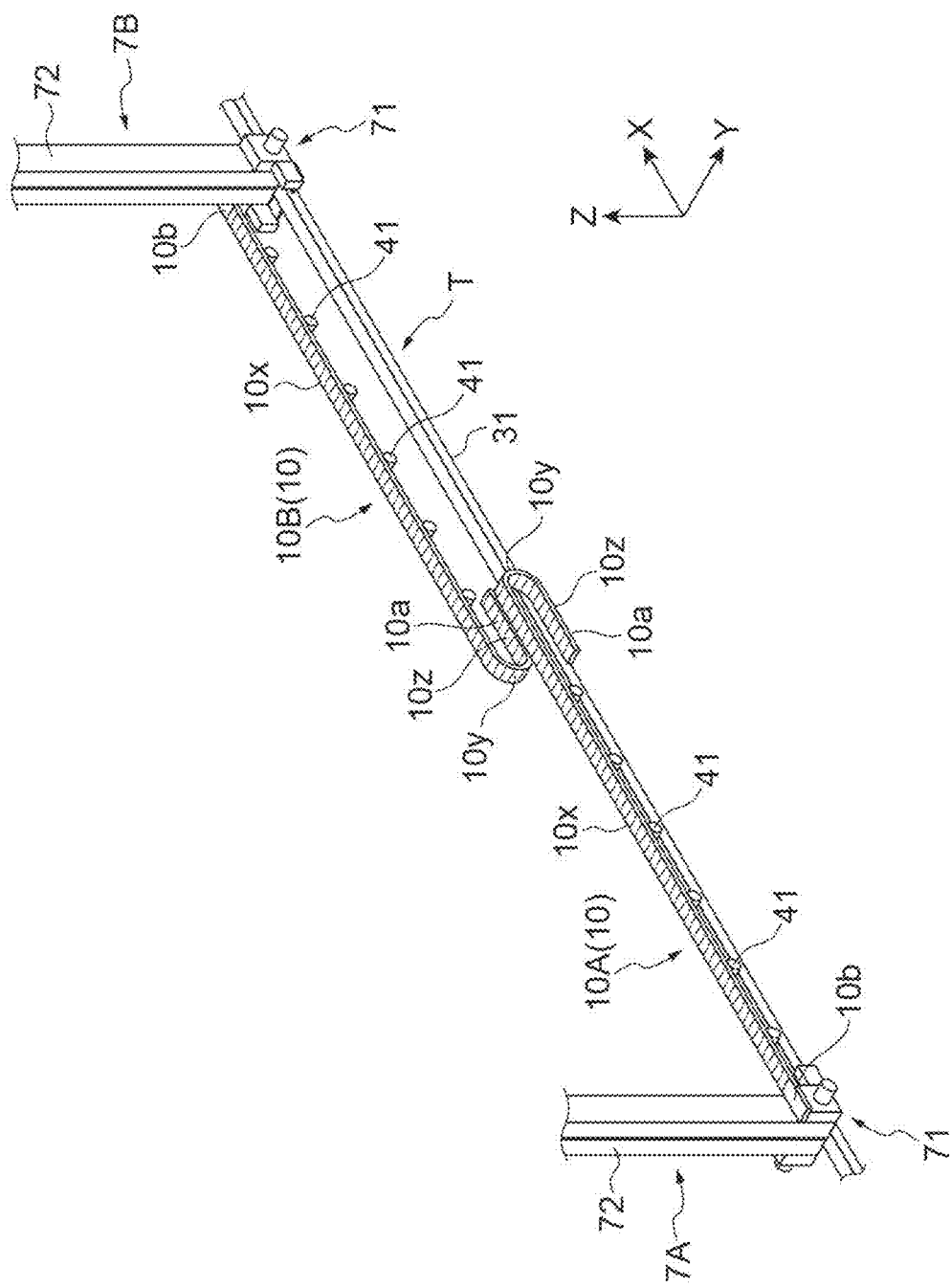
FIG. 6 is a perspective view illustrating the arrangement of the rail, the two cranes, and two cable parts.

The following describes the movement range of the crane 7 and a configuration related to power supply to the crane 7 with reference to FIG. 4 to FIG. 7. As illustrated in FIG. 4 to FIG. 6, the left stocker 2 includes a first cable device 8A configured to supply power to the left first crane 7A and a second cable device 8B configured to supply power to the left second crane 7B. The first cable device 8A includes a first cable part 10A connected to the traveling part 71 of the left first crane 7A. The second cable device 8B includes a second cable part 10B connected to the traveling part 71 of the left second crane 7B. The following describes the configuration of a cable device 8 and a cable part 10, which are similarly provided in both cranes 7, in detail.

Figure 7:
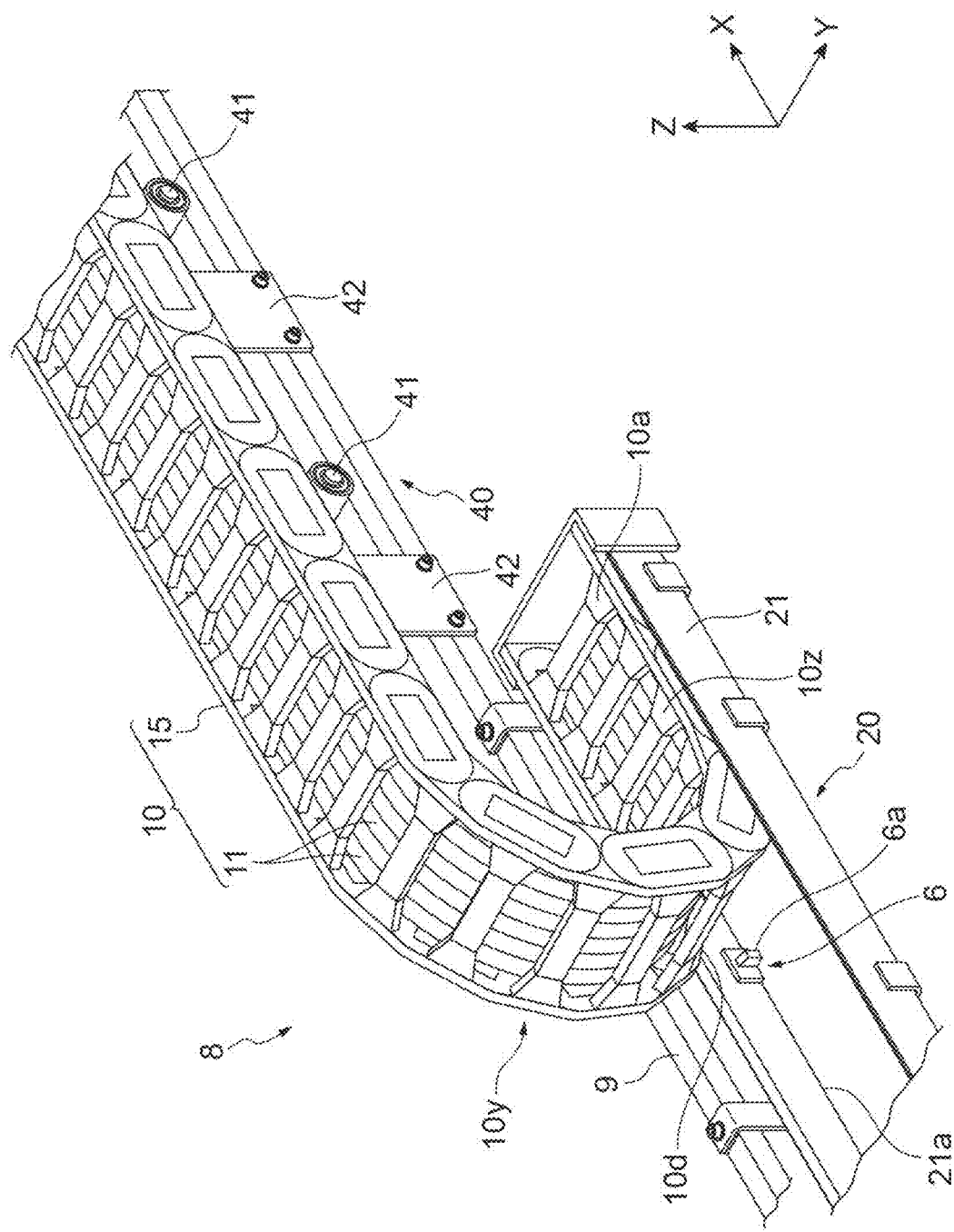
FIG. 7 is a perspective view illustrating a first sensor provided correspondingly to a cable device.

As illustrated in FIG. 7, the cable part 10 has the cable part 10 configured to supply power to the crane 7, a cable guide 20 guiding and holding a grounded part (a lower part 10z described below) of the cable part 10, and a guide roller 40 supporting a lifted part (an upper part 10x described below) of the cable part 10. As illustrated in FIG. 4, the cable part 10 includes a first end 10a mounted on a central part 25 of the left stocker 2 in the X direction and a second end 10b mounted on the crane 7. The cable part 10 moves following the crane 7 in accordance with the movement of the crane 7. The cable part 10 has an elongated shape. The cable part 10 includes the upper part 10x extending from the crane 7 to one side in the X direction, a U-shaped part 10y extending from the upper part 10x to fold back downward in a U-shape, and the lower part 10z extending from the U-shaped part 10y to the other side in the X direction. When the crane 7 moves to the one side or the other side in the X direction, the cable part 10 can move in such a manner that the second end 10b and the U-shaped part 10y stroke (move) to the one side or the other side accordingly. Although the lengths of the upper part 10x and the lower part 10z in the X direction change along with the movement of the cable part 10, the upper part 10x always includes the second end 10b, whereas the lower part 10z always includes the first end 10a.

The cable part 10 includes a power cable 11 and a protective guide member 15. The power cable 11 is connected to the crane 7 and connected to a power supply unit (not illustrated) in the stocker 2. With this configuration, power is supplied to the crane 7 from the power supply unit via the power cable 11. The power cable 11 is not limited to a particular cable, and cables of various shapes or with specifications can be used.

The protective guide member 15 houses the power cable 11 inside to protect the power cable 11. Along with this, the protective guide member 15 guides the power cable 11 in such a manner that the power cable 11 moves following the movement of the crane 7. The protective guide member 15 defines a cable housing part. The protective guide member 15 includes a movable end and a fixed end. The movable end, which defines part of the second end 10b, is connected to the traveling part 71 of the crane 7. The fixed end, which defines part of the first end 10a, is mounted on a base 9 of the stocker 2 (refer to FIG. 5 and FIG. 7). The protective guide member 15 is configured to bend only in the direction about an axis along the Y direction. The protective guide member 15 is not limited to a particular member, and parts of various shapes or with specifications can be used.

As illustrated in FIG. 7, the cable guide 20 extends in the X direction parallel to the travel rail 31 and includes a guide body 21 housing the lower part 10z of the cable part 10. The guide body 21 is a U-shaped member in cross section opened upward and, while supporting the lower part 10z, guides the lower part 10z in such a manner that it does not shift the position in the Y direction. The guide body 21 extends from the central part 25 to the side opposite to the crane 7 to which the cable part 10 is connected. In the second cable device 8B illustrated in FIG. 4, for example, the guide body 21 of the cable guide 20 extends from the central part 25 to the front of the left maintenance area M1. In FIG. 4 to FIG. 6, the cable guide 20 is omitted.

The guide roller 40 includes a plurality of rollers 41 spaced at certain intervals in the X direction. Each roller 41 is rotatable about an axis along the Y direction, for example. Each roller 41 is mounted on the base 9 via a stay 42 or the like. The guide rollers 40 smoothly guide the moving upper part 10x in the X direction along with the movement of the crane 7 and support the upper part 10x from below. In FIG. 6, only the rollers 41 are illustrated, with the base 9, the stay 42, and the like omitted.

As illustrated in FIG. 5, in the left stocker 2, the first cable device 8A and the second cable device 8B are separated from each other in the Y direction. The first cable part 10A and the second cable part 10B are separated from each other in the Y direction. The travel route T, that is, the travel rail 31, is placed between the first cable part 10A and the second cable part 10B. The base 9 supporting the first cable part 10A and the base 9 supporting the second cable part 10B are placed outside the first cable part 10A and the second cable part 10B (away from the travel rail 31 in the Y direction). As illustrated in FIG. 6, the first cable part 10A and the second cable part 10B, which extend in parallel to each other spaced apart from each other in the Y direction, move in separate spaces on both sides of the travel rail 31 (the travel route T) without interfering with each other.

As illustrated in FIG. 4 and FIG. 5, the left second crane 7B is travelable (movable) in substantially the entire area in the X-direction and can access all (or most) shelves S of the rack 4. The left second crane 7B can move over substantially the entire main area MA and the central maintenance area M2. The left first crane 7A is similarly travelable (movable) in substantially the entire area in the X-direction and can access all (or most) shelves S of the rack 4. The left first crane 7A can move over substantially the entire main area MA and the left maintenance area M1. In the example illustrated in FIG. 5, the left second crane 7B is housed in the central maintenance area M2, whereas the left first crane 7A is housed in the left maintenance area M1. The left first crane 7A and the left second crane 7B travel on the same travel rail 31, and thus their right-and-left positional relation is unchanged.

In the left stocker 2 of the present preferred embodiment, as illustrated in FIG. 4, the U-shaped part 10y of the cable part 10 opens from the central part 25 toward the outside of the left stocker 2 in the X direction. The U-shaped part 10y is always positioned in the main area MA. When the crane 7 is farthest away from the maintenance area where it will be housed, the tip of the U-shaped part 10y does not reach the other maintenance area (the maintenance area where the crane 7 will not be housed). When the left second crane 7B, for example, is farthest away from the central maintenance area M2, that is, when it is at its leftmost position indicated by the imaginary line in FIG. 4, the tip of the U-shaped part 10y is not in the left maintenance area M1. The second cable part 10B is configured in such a manner that the U-shaped part 10y does not overlap the left maintenance area M1, no matter what position the left second crane 7B is in. The same applies to the relation among the left first crane 7A, the second cable part 10B, and the central maintenance area M2. Both the left second crane 7B and the left first crane 7A cover conveyance in the entire operating range in the left stocker 2.

The left stocker 2 of the present preferred embodiment is configured in such a manner that the crane 7 can be automatically pulled out (that is, moved) to the maintenance area when performing maintenance work of the crane 7, for example. A plurality of sensors detect the position of the crane 7, and thereby the speed of the crane 7 is controlled in stages, which in turn pulls out (moves) the crane 7 quickly. The following describes a configuration related to travel control when pulling out the crane.

Figure 8A:
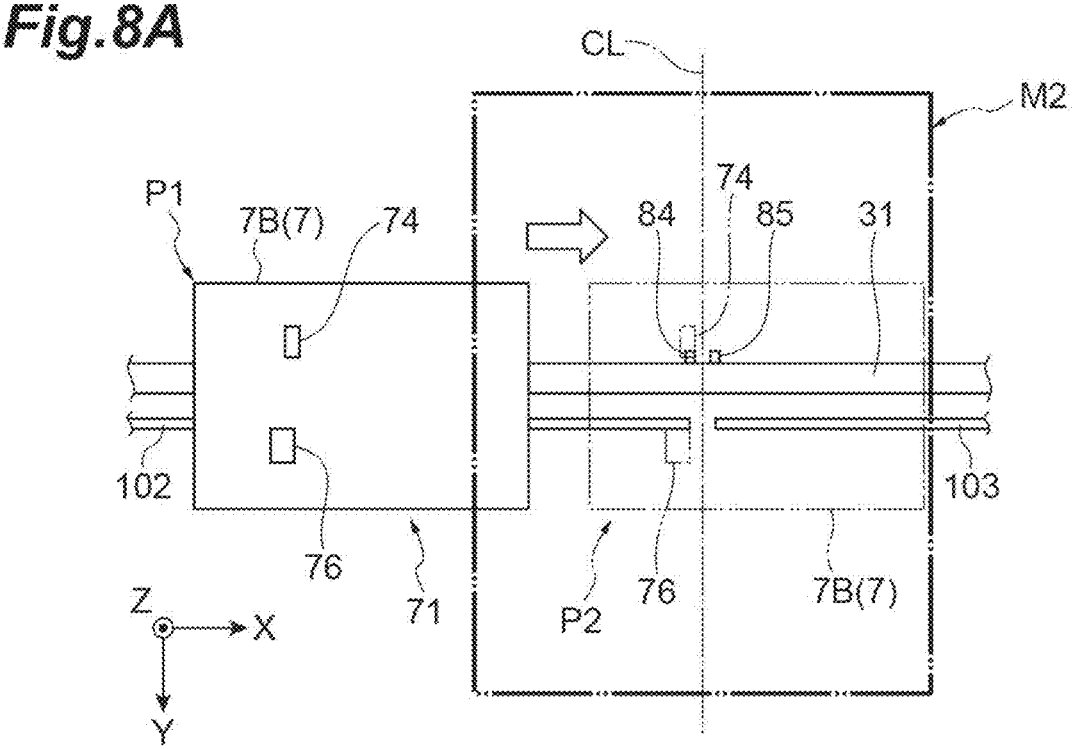
FIG. 8A and FIG. 8B are plan views illustrating the arrangement of a second sensor at the lower part of the crane, with FIG. 8A illustrating a state in which a first crane enters from one side of the maintenance area and FIG. 8B illustrating a state in which a second crane enters from the other side of the maintenance area.
Figure 8B:
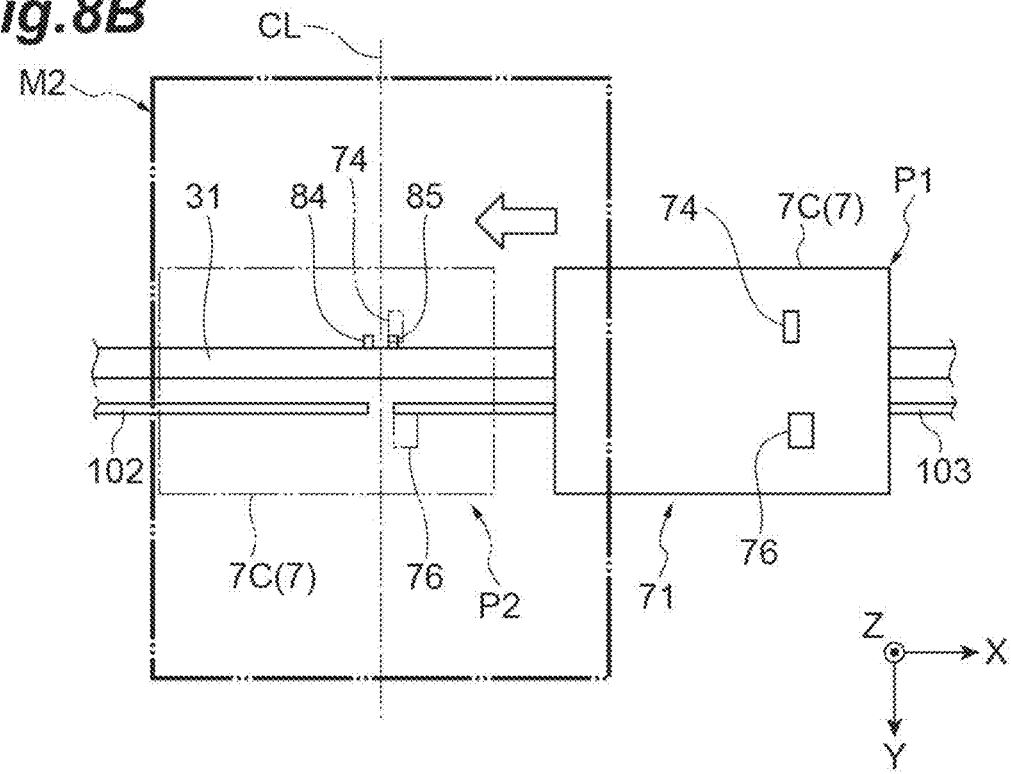

As illustrated in FIG. 7, the left stocker 2 includes a first sensor 6 to detect that the left second crane 7B is positioned at an entry position P1 (refer to FIGS. 8A and 8B) with entry into the central maintenance area M2. As illustrated in FIGS. 8A and 8B, the left stocker 2 includes a lower second sensor 74 and an upper second sensor 94 to detect that the left second crane 7B has arrived at the stop position P2 in the central maintenance area M2.

As illustrated in FIG. 7, the first sensor 6 is provided correspondingly to the cable part 10 configured to supply power to the crane 7 (to detect the cable part 10). The first sensor 6 is installed in a corner part 21a of the guide body 21, for example. The first sensor 6 includes a switch part 6a that is immersed by a detected part 10d of the cable part 10 set closer to the first end 10a being placed thereon and detects the presence of the detected part 10d. While the crane 7 is positioned in the main area MA, such as when it is in normal operation, the first sensor 6 continues to detect the presence of the detected part 10d. When the crane 7 arrives at the entry position P1 (refer to FIGS. 8A and 8B) with entry into the maintenance area, the detected part 10d separates from the first sensor 6, the switch part 6a protrudes under an urging force of an internal spring or the like, and the first sensor 6 detects the absence of the detected part 10d. In this way, the first sensor 6 detects that the crane 7 is positioned at the entry position P1 by detecting the movement of the cable part 10 connected to the crane 7. Based on whether the detected part 10d is present at the installation position of the first sensor 6, the first sensor 6 can detect that the crane 7 is positioned in the main area MA and can also detect that the crane 7 is positioned at the entry position P1. When this first sensor 6 is included, the detected part 10d is simply a part of the cable part 10 (the protective guide member 15) and has the same configuration as the other parts (no separate members or the like are added). The detected part 10d is set at an appropriate position corresponding to the entry position P1 when designing the cable part 10, and the first sensor 6 is installed at the position where the detected part 10d is placed. In the present preferred embodiment, the first sensor 6 is installed in the central part 25 of the left stocker 2 (refer to also FIG. 5). The term "closer to the first end 10a of the cable part 10" means that the distance from the detected part 10d to the first end 10a is at least shorter than the distance from the detected part 10d to the second end 10b (the crane 7).

Figure 9A:
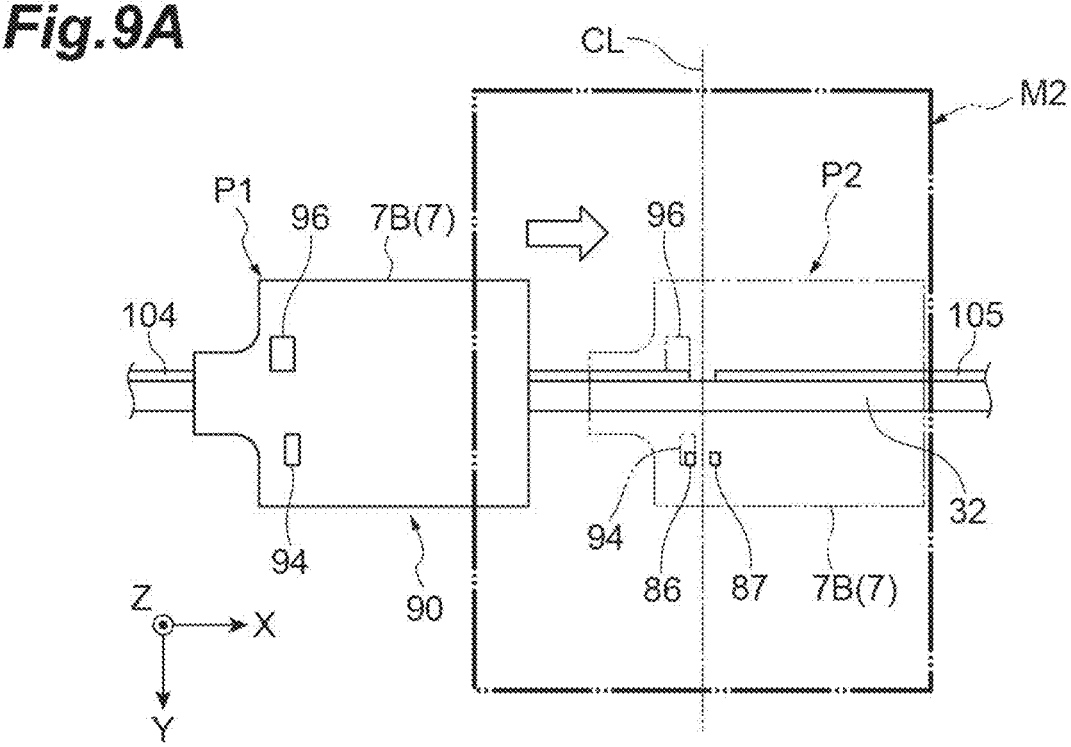
FIGS. 9A and 9B are plan views illustrating the arrangement of the second sensor at the upper part of the crane, with FIG. 9A illustrating a state in which the first crane enters from one side of the maintenance area and FIG. 9B illustrating a state in which the second crane enters from the other side of the maintenance area.

As illustrated in FIG. 8A, the lower second sensor 74 is mounted on the traveling part 71 of the left second crane 7B (the crane 7). The lower second sensor 74 comes in proximity (or contact) with a dog 84 mounted in the central maintenance area M2 (the maintenance area) to detect that the left second crane 7B has arrived at the stop position P2 in the central maintenance area M2. As illustrated in FIG. 9A, the upper second sensor 94 is mounted on the auxiliary traveling part 90 of the left second crane 7B (the crane 7). The upper second sensor 94 comes in proximity (or contact) with a dog 86 mounted in the central maintenance area M2 (the maintenance area) to detect that the left second crane 7B has arrived at the stop position P2 in the central maintenance area M2. Thus, the lower second sensor 74 and the upper second sensor 94 are provided for the left second crane 7B (the crane 7). As the lower second sensor 74 and the upper second sensor 94, photoelectric sensors may be used or limit switches, proximity sensors, eddy current displacement sensors, laser sensors, or the like may be used.

Figure 9B:
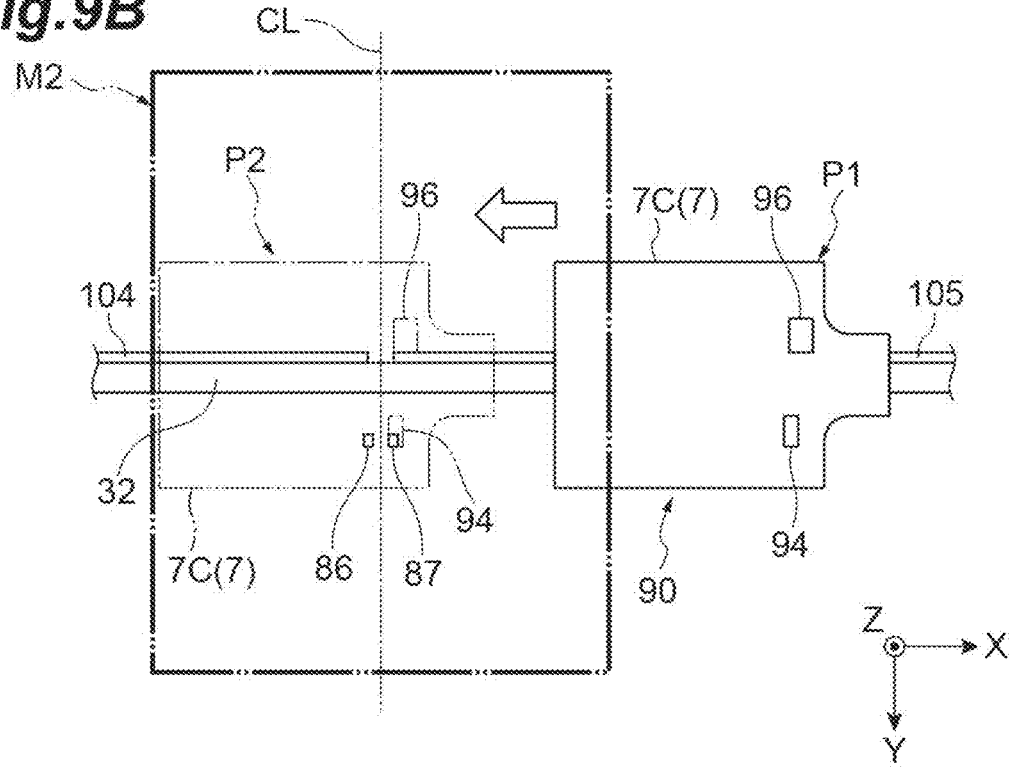

In the left stocker 2 of the present preferred embodiment, the central maintenance area M2 is shared by the left second crane 7B and the right first crane 7C (another crane). To explain the configuration related to travel control when pulling out the right first crane 7C, as illustrated in FIG. 8B, the lower second sensor 74 (another second sensor) having the same configuration as above is mounted on the traveling part 71 of the right first crane 7C (the crane 7). The lower second sensor 74 comes in proximity (or contact) with a dog 85 mounted in the central maintenance area M2 (the maintenance area) to detect that the right first crane 7C has arrived at the stop position P2 in the central maintenance area M2. As illustrated in FIG. 9B, the upper second sensor 94 (another second sensor) having the same configuration as above is mounted on the auxiliary traveling part 90 of the right first crane 7C (the crane 7). The upper second sensor 94 comes in proximity (or contact) with a dog 87 mounted in the central maintenance area M2 (the maintenance area) to detect that the right first crane 7C has arrived at the stop position P2 in the central maintenance area M2. Thus, the lower second sensor 74 and the upper second sensor 94 are provided correspondingly to the right first crane 7C (the crane 7).

In the lower part of the central maintenance area M2, as illustrated in FIGS. 8A and 8B, the dog 84 and the dog 85 are provided side by side spaced apart from each other in the X direction. A center line CL of the central maintenance area M2 is placed between the dog 84 and the dog 85. The position detection operation for the left second crane 7B by detecting the dog 84 and the position detection operation for the right first crane 7C by detecting the dog 85 do not interfere with each other. In other words, the placement of the lower second sensor 74 in the left second crane 7B and the right first crane 7C and the placement of the dog 84 and the dog 85 are separate from each other and have no effect on each other when the left second crane 7B and the right first crane 7C arrive at the stop position P2. Although not used in the travel control during pulling out in the present preferred embodiment, a lower encoder 76 and a position detection rack 102 configured to detect the position of the left second crane 7B and the lower encoder 76 and a position detection rack 103 configured to detect the position of the right first crane 7C are also placed separately on both sides of the center line CL, which are spaced apart from each other in the X direction. When the left second crane 7B and the right first crane 7C arrive at the stop position P2, the lower encoder 76 and the position detection rack 102 of the left second crane 7B and the lower encoder 76 and the position detection rack 103 of the right first crane 7C do not interfere with each other.

In the upper part of the central maintenance area M2, as illustrated in FIGS. 9A and 9B, the dog 86 and the dog 87 are provided side by side spaced apart from each other in the X direction. The center line CL of the central maintenance area M2 is placed between the dog 86 and the dog 87. The position detection operation for the left second crane 7B by detecting the dog 86 and the position detection operation for the right first crane 7C by detecting the dog 87 do not interfere with each other. In other words, the placement of the upper second sensor 94 in the left second crane 7B and the right first crane 7C and the placement of the dog 86 and the dog 87 are separate from each other and have no effect on each other when the left second crane 7B and the right first crane 7C arrive at the stop position P2. Although not used in the travel control during pulling out in the present preferred embodiment, an upper encoder 96 and a position detection rack 104 configured to detect the position of the left second crane 7B and the upper encoder 96 and a position detection rack 105 configured to detect the position of the right first crane 7C are also placed separately on both sides of the center line CL, which are spaced apart from each other in the X direction. When the left second crane 7B and the right first crane 7C arrive at the stop position P2, the upper encoder 96 and the position detection rack 104 of the left second crane 7B and the upper encoder 96 and the position detection rack 105 of the right first crane 7C do not interfere with each other.

To explain the travel control of the left second crane 7B and the right first crane 7C in the central maintenance area M2 from another viewpoint, as illustrated in FIGS. 8A and 8B and FIGS. 9A and 9B, the stop position P2 of the left second crane 7B and the stop position P2 of the right first crane 7C are different from each other in the central maintenance area M2. The travel path of the left second crane 7B leading to its stop position P2 and the travel path of the right first crane 7C leading to its stop position P2 overlap. In the stop position P2 of the left second crane 7B illustrated in FIGS. 8A and 9A, the center of the left second crane 7B in a plan view is positioned at an end of the central maintenance area M2 closer to the right stocker 3 (the right end in the drawing) beyond the center line CL. However, the lower second sensor 74 and the upper second sensor 94 of the left second crane 7B always maintain a certain distance or more from the dogs 85 and 87 for the right first crane 7C until arriving at the stop position P2 of the left second crane 7B. In other words, the lower second sensor 74 and the upper second sensor 94 do not detect the dogs 85 and 87. Similarly, in the stop position P2 of the right first crane 7C illustrated in FIGS. 8B and 9B, the center of the left second crane 7B in a plan view is positioned at an end of the central maintenance area M2 closer to the left stocker 2 (the left end in the drawing) beyond the center line CL. However, the lower second sensor 74 and the upper second sensor 94 of the right first crane 7C always maintain a certain distance or more from the dogs 84 and 86 for the left second crane 7B until arriving at the stop position P2 of the right first crane 7C. In other words, the lower second sensor 74 and the upper second sensor 94 do not detect the dogs 84 and 86.

The lower second sensor 74 and the upper second sensor 94 are provided at respective ends of the traveling part 71 and the auxiliary traveling part 90 (the ends opposite to the central maintenance area M2 where they will be housed), and thus such avoidance of interference is easily achieved. The same applies to the placement of the lower encoder 76 and the upper encoder 96. These encoders are provided at respective ends of the traveling part 71 and the auxiliary traveling part 90 (the ends opposite to the central maintenance area M2 where they will be housed).

Thus, the lower second sensor 74 of the left second crane 7B and the lower second sensor 74 of the right first crane 7C can independently detect the arrival of the left second crane 7B at the stop position P2 and the arrival of the right first crane 7C at the stop position P2. The upper second sensor 94 of the left second crane 7B and the upper second sensor 94 of the right first crane 7C can independently detect the arrival of the left second crane 7B at the stop position P2 and the arrival of the right first crane 7C at the stop position P2.

The following describes an operation to pull out (an operation to move, a method for controlling movement of) the crane 7 using the operating device 50 with reference to FIG. 3 and FIGS. 10A to 10C. As illustrated in FIG. 3, the operating device 50 includes an operating unit 51, a display unit 52, and a communication unit 53. The operating device 50 may be a terminal such as a tablet so that an operator can easily operate the crane 7. The operating unit 51 is a touch panel or the like provided on the display unit 52, for example. The display unit 52 is a liquid crystal display or the like, for example. The communication unit 53 can communicate information with the controller 30 by wireless communication or wired communication. The controller 30, which is a higher-level controller, may be provided in each maintenance area, for example, or may be installed in the traveling part 71 or the like of the crane 7. The controller 30 is an electronic control unit including a processor (CPU), a ROM, and a RAM. The controller 30 controls the parts of the crane 7, including the traveling motor 78.

When performing maintenance work of the crane 7, the operator first stops the stocker 1. The left first crane 7A, the left second crane 7B, the right first crane 7C, and the right second crane 7D all stop, for example. Any one of the cranes 7 is then moved to the corresponding maintenance area. For example, the following describes a case in which the left second crane 7B is moved to the central maintenance area M2 as an example. On the operating device 50 corresponding to the left second crane 7B, the operator presses with his/her finger the operating unit 51 that says "Move to maintenance dock" displayed on the display unit 52 of the operating device 50. Alternatively, the operating device 50 may be configured to allow selection of the crane 7 to be moved using the operating device 50.

Figure 10B:
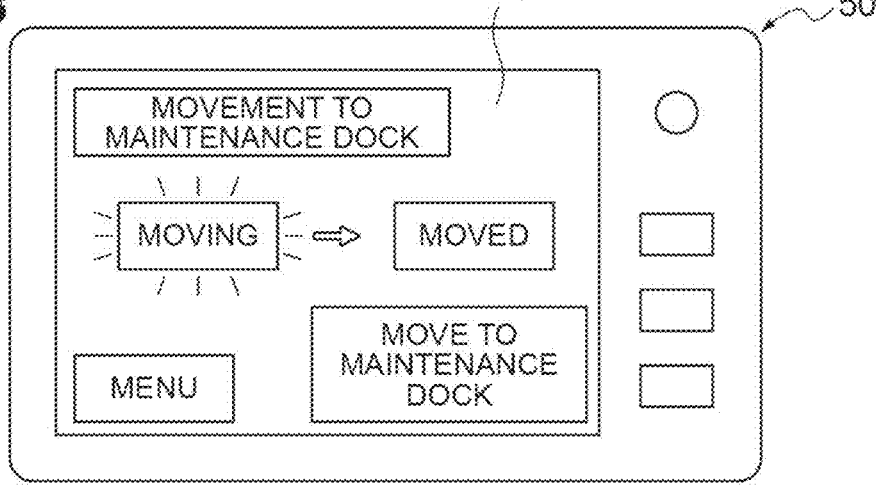

Upon pushing the operating unit 51 with a finger, the controller 30 controls the traveling motor 78 to cause the left second crane 7B to travel. In this process, the controller 30 causes the left second crane 7B to travel on the condition that no other crane (in this case, the right first crane 7C) is present in the central maintenance area M2. The controller 30 stores therein at least two instruction values for the traveling speed of the crane 7. One is an instruction value corresponding to a normal traveling speed that can be applied when the crane 7 moves from one point to another in the main area MA. This normal traveling speed may be determined by the controller 30 through calculation in accordance with a distance to travel. The distance to travel is calculated as the distance from the current position of the crane 7 to the entry position P1. In this case, the controller 30 recognizes the current position of the left second crane 7B based on output signals from the lower encoder 76 and the upper encoder 96 and determines the distance to travel to the entry position P1. The controller 30 outputs the instruction value corresponding to the normal traveling speed toward the traveling motor 78 to cause the left second crane 7B to travel toward the central maintenance area M2. In this state, the second cable part 10B is placed on the first sensor 6, and the switch part 6a is immersed. The first sensor 6 detects the presence of the detected part 10d. As illustrated in FIG. 10B, the operating device 50 informs the operator that the crane 7 is moving by, for example, blinking the "Moving" lamp on the display unit 52.

The controller 30 stores therein an instruction value corresponding to a second traveling speed during deceleration control, which is slower than the normal traveling speed. Upon arrival of the left second crane 7B at the entry position P1 (refer to FIGS. 8A and 8B) with entry into the central maintenance area M2, the detected part 10d of the second cable part 10B leaves the first sensor 6, and the switch part 6a protrudes. The first sensor 6 detects the absence of the detected part 10d. Upon input of a detection signal indicating that the left second crane 7B is positioned at the entry position P1 (refer to FIG. 8A) from the first sensor 6, the controller 30 reduces the rotational speed of the traveling motor 78 and controls the left second crane 7B to decelerate. The second traveling speed may be half the normal traveling speed or less, one-fifth thereof or less, or one-tenth thereof or less. The second traveling speed may be set based on the size (height) or weight of the crane 7, the size of the central maintenance area M2, or the like. Thus, the controller 30 controls the left second crane 7B to decelerate in accordance with the detection result of the first sensor 6. Again, as illustrated in FIG. 10B, the operating device 50 informs the operator that the crane 7 is moving by, for example, blinking the "Moving" lamp on the display unit 52. During performing the deceleration control, the operator may be informed that the crane 7 is moving at a low speed by, for example, relatively lengthening the blink intervals of the lamp.

Figure 10C:
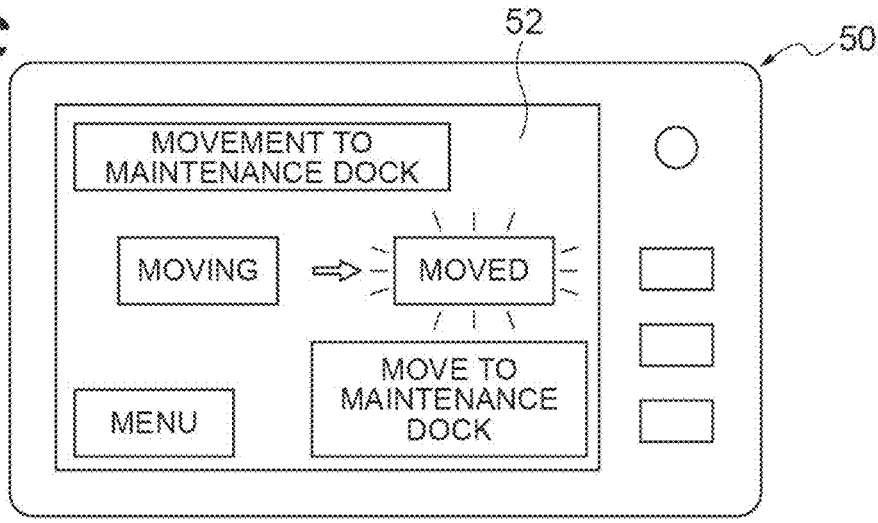

Subsequently, upon arrival of the left second crane 7B at the stop position P2 in the central maintenance area M2 (refer to the imaginary line in FIGS. 8A and 9A), the lower second sensor 74 comes in proximity (or contact) with the dog 84, and the upper second sensor 94 comes in proximity (or contact) with the dog 86. Upon input of a detection signal indicating that the left second crane 7B has arrived at the stop position P2 from the lower second sensor 74, the controller 30 stops the traveling motor 78 and controls the left second crane 7B to stop. Upon input of a detection signal indicating that the left second crane 7B has arrived at the stop position P2 from the upper second sensor 94, the controller 30 stops a traveling motor, not illustrated, of the auxiliary traveling part 90 and controls the left second crane 7B to stop. The controller 30 may control the left second crane 7B to stop when the detection signal indicating that the left second crane 7B has arrived at the stop position P2 is input from at least one of the lower second sensor 74 and the upper second sensor 94. Thus, the controller 30 controls the left second crane 7B to stop in accordance with the detection results of the lower second sensor 74 and/or the upper second sensor 94. As illustrated in FIG. 10C, the operating device 50 informs the operator that the crane 7 has been pulled out (moved) by, for example, blinking the "Moved" lamp on the display unit 52.

Through the above series of control, the left second crane 7B is pulled out (moved) to the stop position P2 in the central maintenance area M2. Although the pulling-out operation of the left second crane 7B has been described as an example, the controller 30 performs the same pulling-out control of other cranes 7. When performing the pulling-out control of the right first crane 7C, as described above, the dog 84 and the dog 86 are not involved in position detection, and the dog 85 and the dog 87 detect the arrival of the right first crane 7C at the stop position P2. The left maintenance area M1 and the right maintenance area M3 receive the left first crane 7A and the right second crane 7D, respectively, from only one direction each, and thus one dog is provided for each of them.

With the stocker 1 of the present preferred embodiment, the controller 30 controls the crane 7 to cause the crane 7 to travel toward the maintenance area provided on the extension of the travel route T. The traveling speed of the crane 7 in this process is set to the normal traveling speed. Upon detection that the crane 7 is positioned at the entry position P1 by the first sensor 6, the controller 30 controls the crane 7 to decelerate. Subsequently, upon detection that the crane 7 has arrived at the stop position P2 in the maintenance area by the lower second sensor 74 and/or the upper second sensor 94, the controller 30 controls the crane 7 to stop. Thus, the crane 7 moves at a relatively high traveling speed until it enters the maintenance area and then decelerates in the maintenance area. Furthermore, the crane 7 automatically stops at the stop position P2. The stocker 1 performing this two-step speed change can move the crane 7 to the maintenance area quickly and easily. The crane 7 moves at a low speed in the maintenance area, which also maintains safety.

Conventionally, when pulling out a heavy crane manually (by hand) to a maintenance area, operators have pulled out auxiliary wheels to release a travel brake and to move the crane. Movement by hand-pushing was time-consuming and placed a heavy burden on operators. Even after completion of the movement, it was not clear whether the crane properly stopped at the stop position in the maintenance area, and it was necessary to close and check a platform. The stocker 1 of the present preferred embodiment solves the conventional problems. The crane 7 moves by the traveling motor 78, and thus it is quick and places little burden on operators. The crane 7 surely stops at the stop position P2.

The first sensor 6 is provided correspondingly to the cable device 8, whereas the lower second sensor 74 and/or the upper second sensor 94 are provided correspondingly to the crane 7. The first sensor 6 and the lower second sensor 74 and/or the upper second sensor 94 can be separated from each other in installation position, thus increasing the degree of freedom in the installation positions of both sensors.

The first sensor 6 detects that the crane 7 is positioned or not positioned at the entry position P1 based on the presence or absence of the detected part 10d closer to the first end 10a of the cable part 10. The first end 10a is mounted on the central part in the left stocker 2, and thus the first sensor 6 is also provided near the central part (refer to FIG. 5). Although various devices are installed in the maintenance area, it is not necessary to install the first sensor 6 around the maintenance area. The central part in the left stocker 2 has more space than the maintenance area does, thus increasing the degree of freedom in the installation position of the first sensor 6. The first sensor 6 can also be used to detect that the crane 7 is positioned in the main area MA (that it is in normal operation in the stocker 1, for example) by detecting the presence of the detected part 10d.

The travel route T is placed between the first cable part 10A and the second cable part 10B. In other words, the first cable part 10A and the second cable part 10B are placed on both sides of the travel route T (both sides in the Y direction). Thus, two first sensors 6 can be placed in a distributed manner on both sides of the travel route T, making the stocker compact as a whole. Moreover, the first sensor 6 is installed inside the guide body 21, thus reducing its size.

In the central maintenance area M2, the lower second sensor 74 of the left second crane 7B and the lower second sensor 74 of the right first crane 7C can independently detect the arrival of the left second crane 7B at the stop position P2 and the arrival of the right first crane 7C at the stop position P2. The upper second sensor 94 of the left second crane 7B and the upper second sensor 94 of the right first crane 7C can independently detect the arrival of the left second crane 7B at the stop position P2 and the arrival of the right first crane 7C at the stop position P2. Each second sensor 74 or 94 enables accurate detection about the stop position P2 in a crane to be detected without being affected by the movement of a crane not to be detected.

The preferred embodiments of the present disclosure has been described. The present invention is not limited to the above preferred embodiments. For example, in the crane 7, the upper traveling part (the auxiliary traveling part 90 of the above preferred embodiments) may be omitted. The auxiliary rail 32 and the auxiliary traveling part 90 may be omitted, and the crane 7 may travel only on the travel rail 31. The left stocker 2 or the right stocker 3 may include a single crane 7 and a single rack 4. In that case, a single maintenance area may be provided for one stocker.

The position of the crane 7 triggering the deceleration control is not limited to the entry position P1. The first sensor 6 may be provided correspondingly to the cable device 8 and may detect that the crane 7 is positioned at the proximity position close to the maintenance area by detecting the movement of the cable part 10. Specifically, the first sensor 6 may detect that crane 7 is positioned or not positioned at the proximity position close to the maintenance area based on whether the detected part 10d is present at the installation position of the first sensor 6. In the proximity position, the crane 7 has not arrived at the maintenance area, but the distance between the crane 7 and the maintenance area is a certain distance or less. In that case, the detected part 10d is set at an appropriate position corresponding to the proximity position, and the first sensor 6 is installed at the position where the detected part 10d is placed. Although the first sensor 6 is installed at the central part 25 (or near the central part 25) of the left stocker 2, it is installed at a position farther from the maintenance area where the crane 7 will be housed than the position of the first sensor 6 of the above preferred embodiments.

The first sensor detecting that the crane 7 is positioned at the proximity position close to the maintenance area or is positioned at the entry position with entry into the maintenance area may have a different configuration from that of the above preferred embodiments. The second sensor configured to detect that the crane 7 has arrived at the stop position P2 may have a different configuration from that of the above preferred embodiments. The second sensor may be provided for the maintenance area, whereas the dog may be provided for the crane 7, for example. The lower encoder 76 and the upper encoder 96 may be used as the first sensor and the second sensor. The position of the crane 7 may be detected by a barcode and a barcode reader or the like instead of the encoder.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A stocker comprising:
a crane to travel on a travel route extending in a travel direction;
a maintenance area on an extension of the travel route;
a controller configured or programmed to cause the crane to travel toward the maintenance area;
a first sensor to detect that the crane is positioned at a proximity position close to the maintenance area or is positioned at an entry position with entry into the maintenance area; and
a second sensor to detect that the crane has arrived at a stop position of the maintenance area; wherein
the controller is configured or programmed to control the crane to decelerate in accordance with a detection result of the first sensor and control the crane to stop in accordance with a detection result of the second sensor;
the first sensor is provided correspondingly to a cable assembly including a cable portion to supply power to the crane and detect that the crane is positioned at the proximity position or is positioned at the entry position by detecting movement of the cable portion; and
the second sensor is provided correspondingly to the crane and/or the maintenance area to detect that the crane has arrived at the stop position.

2. The stocker according to claim 1, wherein
the cable portion includes a first end mounted on a central portion in the stocker in the travel direction and a second end mounted on the crane; and
the first sensor is operable to detect that the crane is positioned at the proximity position or is positioned at the entry position based on whether a detected portion closer to the first end of the cable portion is present at an installation position of the first sensor.

3. The stocker according to claim 1, further comprising a second crane to travel on the travel route; wherein
the cable portion operable to supply power to the crane and a second cable portion operable to supply power to the second crane are spaced apart from each other in a horizontal width direction perpendicular or substantially perpendicular to the travel direction, and the travel route is between the cable portion and the second cable portion.

4. The stocker according to claim 1, further comprising:
another crane to travel on another travel route and sharing the maintenance area with the crane; and
another second sensor to detect that the other crane has arrived at the stop position of the maintenance area; wherein
the second sensor and the other second sensor are capable of independently detecting the arrival of the crane at the stop position and the arrival of the other crane at the stop position.

* * * * *